（12) United States Patent
Gadgaard et al.

(10) Patent No.: US 9,636,638 B2
(45) Date of Patent: May 2, 2017

(54) FILTER ELEMENT

(71) Applicant: GRUNDFOS HOLDING A/S, Bjerringbro (DK)

(72) Inventors: Bent Gadgaard, Odder (DK); Jens Christian Jensen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 34 days.

(21) Appl. No.: 14/420,137

(22) PCT Filed: Aug. 7, 2013

(86) PCT No.: PCT/EP2013/066541
§ 371 (c)(1),
(2) Date: Feb. 6, 2015

(87) PCT Pub. No.: WO2014/023762
PCT Pub. Date: Feb. 13, 2014

(65) Prior Publication Data
US 2015/0190758 A1  Jul. 9, 2015

(30) Foreign Application Priority Data

Aug. 8, 2012  (EP) ..................................... 12179716

(51) Int. Cl.
*B01D 69/10* (2006.01)
*B01D 29/41* (2006.01)
(Continued)

(52) U.S. Cl.
CPC .............. *B01D 69/10* (2013.01); *B01D 29/41* (2013.01); *B01D 63/084* (2013.01); *B01D 63/16* (2013.01);
(Continued)

(58) Field of Classification Search
CPC ........ B01D 69/10; B01D 29/41; B01D 63/16; B01D 63/084; B01D 2321/04; B01D 2313/14; B01D 65/02
See application file for complete search history.

(56) References Cited

U.S. PATENT DOCUMENTS 3,231,094 A * 1/1966 Wiegand ................ B01D 29/41
210/487
4,132,649 A * 1/1979 Croopnick ........... B01D 63/082
210/321.68
(Continued)

FOREIGN PATENT DOCUMENTS

CN         1128501 A      8/1996
DE       38 16 434 A1    11/1988
(Continued)

OTHER PUBLICATIONS

The translation of the Written Opinion for PCT/EP2013/065541, dated Sep. 16, 2013.*

*Primary Examiner* — David A Reifsnyder
(74) *Attorney, Agent, or Firm* — McGlew and Tuttle, P.C.

(57) ABSTRACT

A filter element is provided for a filter element stack. The filter element includes a carrier body (4), at least one spacer which can be subjected to throughflow and at least one filter membrane covering this. The spacer at least partly is formed by a knitted fabric of plastic threads which on one side is covered by a membrane of plastic material, to which it is fixedly connected, and forms a filter material (8) to be fastened on the carrier body (4) with a positive fit (FIG. 5).

20 Claims, 5 Drawing Sheets

(51) Int. Cl.
*B01D 63/16* (2006.01)
*B01D 63/08* (2006.01)
*B01D 65/02* (2006.01)

(52) U.S. Cl.
CPC .......... *B01D 65/02* (2013.01); *B01D 2313/14* (2013.01); *B01D 2321/04* (2013.01)

(56) References Cited

U.S. PATENT DOCUMENTS

| | | | |
|---|---|---|---|
| 5,275,725 A * | 1/1994 | Ishii | B01D 63/084 210/321.67 |
| 5,679,249 A * | 10/1997 | Fendya | B01D 63/16 210/321.63 |
| 5,725,767 A | 3/1998 | Culkin | |
| 5,925,247 A * | 7/1999 | Huebbel | B01D 63/084 210/231 |
| 6,106,713 A | 8/2000 | Miller et al. | |
| 6,209,727 B1 * | 4/2001 | Henttonen | B01D 25/26 210/321.63 |
| 6,416,666 B1 * | 7/2002 | Salyer | B01D 63/16 210/321.63 |
| 2007/0084780 A1 * | 4/2007 | Kuo | B01D 29/41 210/321.75 |
| 2011/0036767 A1 | 2/2011 | Kuo | |

FOREIGN PATENT DOCUMENTS

| | | |
|---|---|---|
| EP | 1 625 885 A1 | 2/2006 |
| EP | 1 721 656 A1 | 11/2006 |
| EP | 1 854 764 A1 | 11/2007 |
| EP | 1 807 184 B1 | 12/2008 |
| EP | 2 002 874 B1 | 1/2011 |
| WO | 95/00231 A1 | 1/1995 |

* cited by examiner

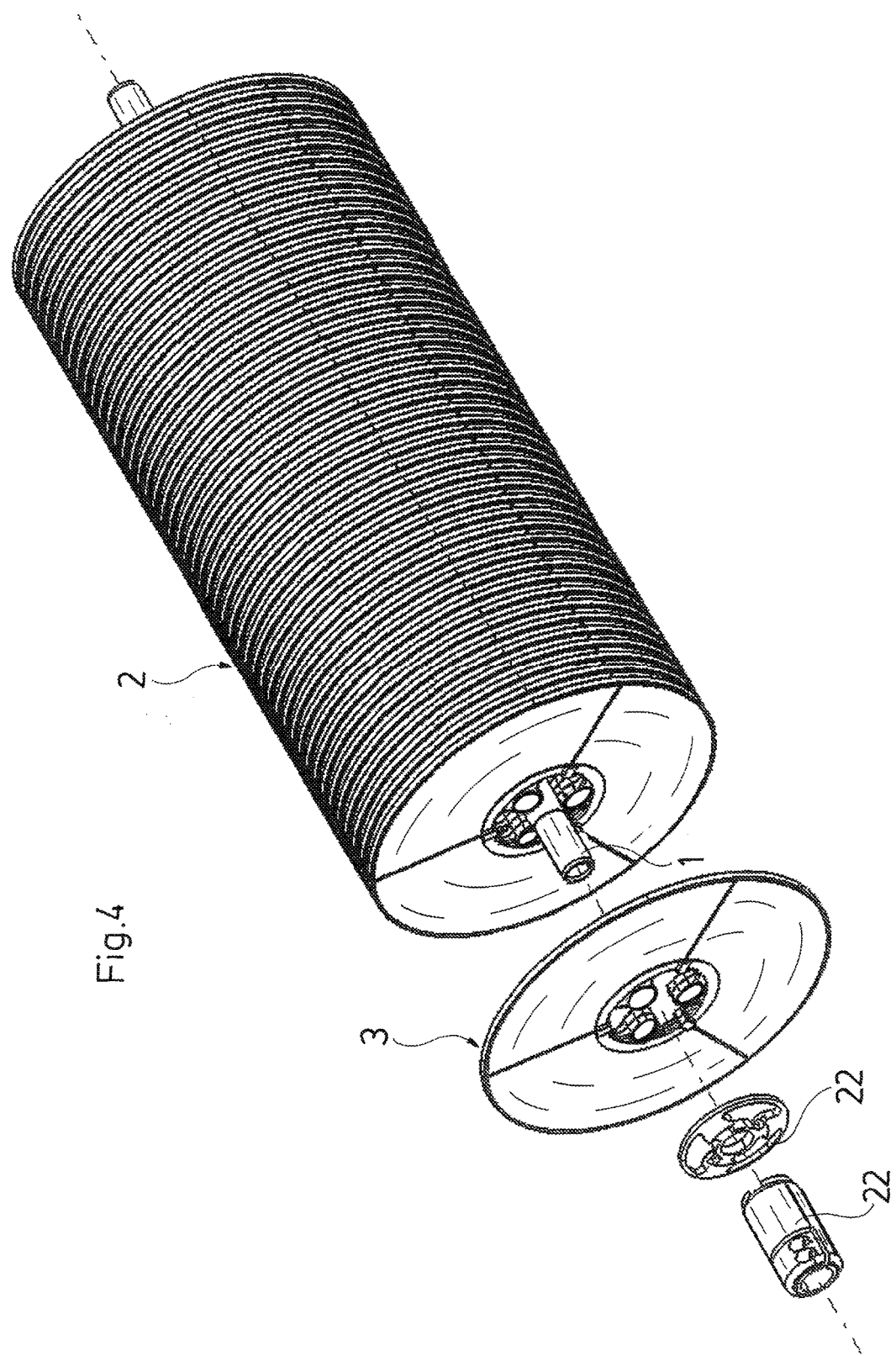

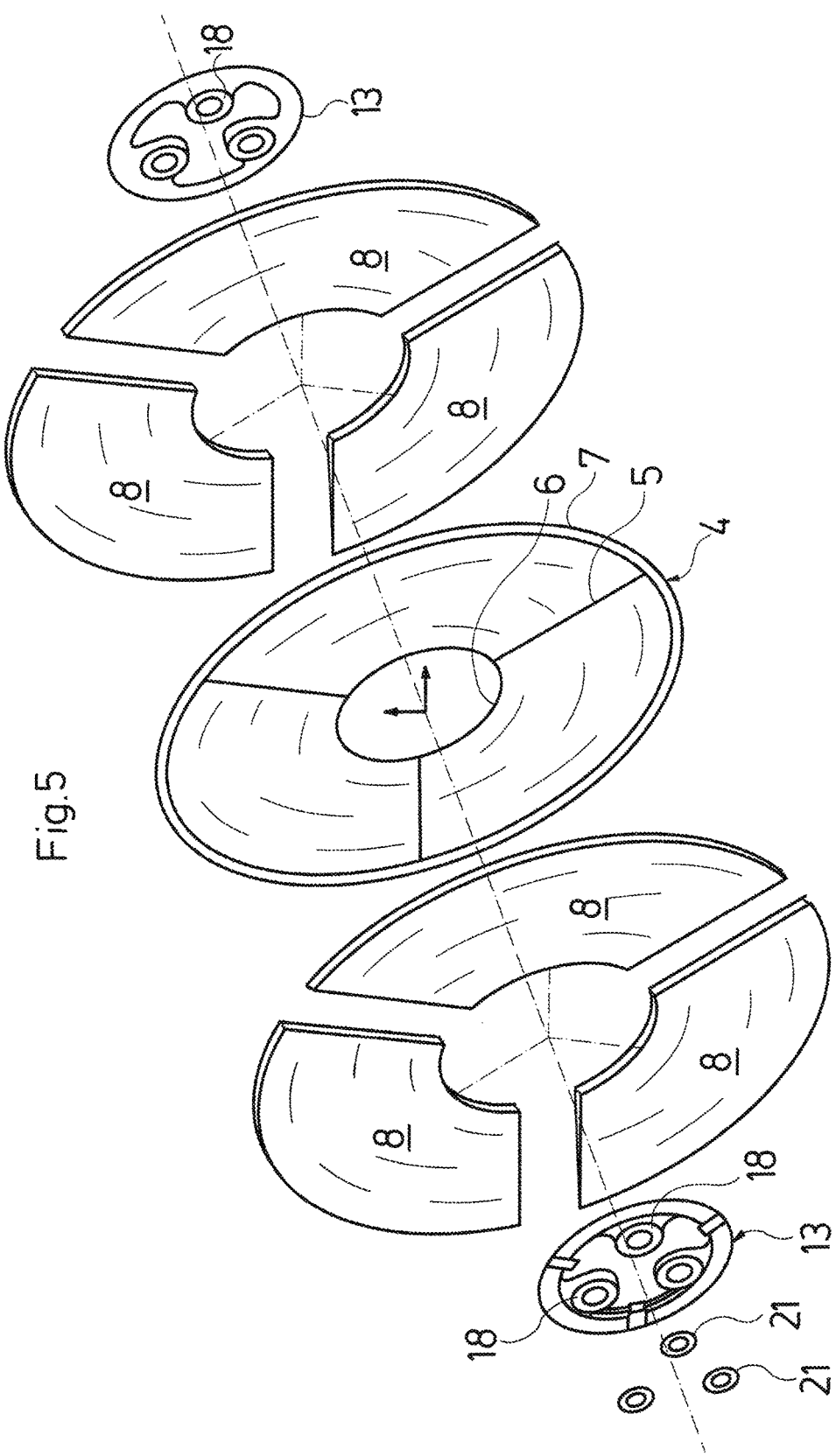

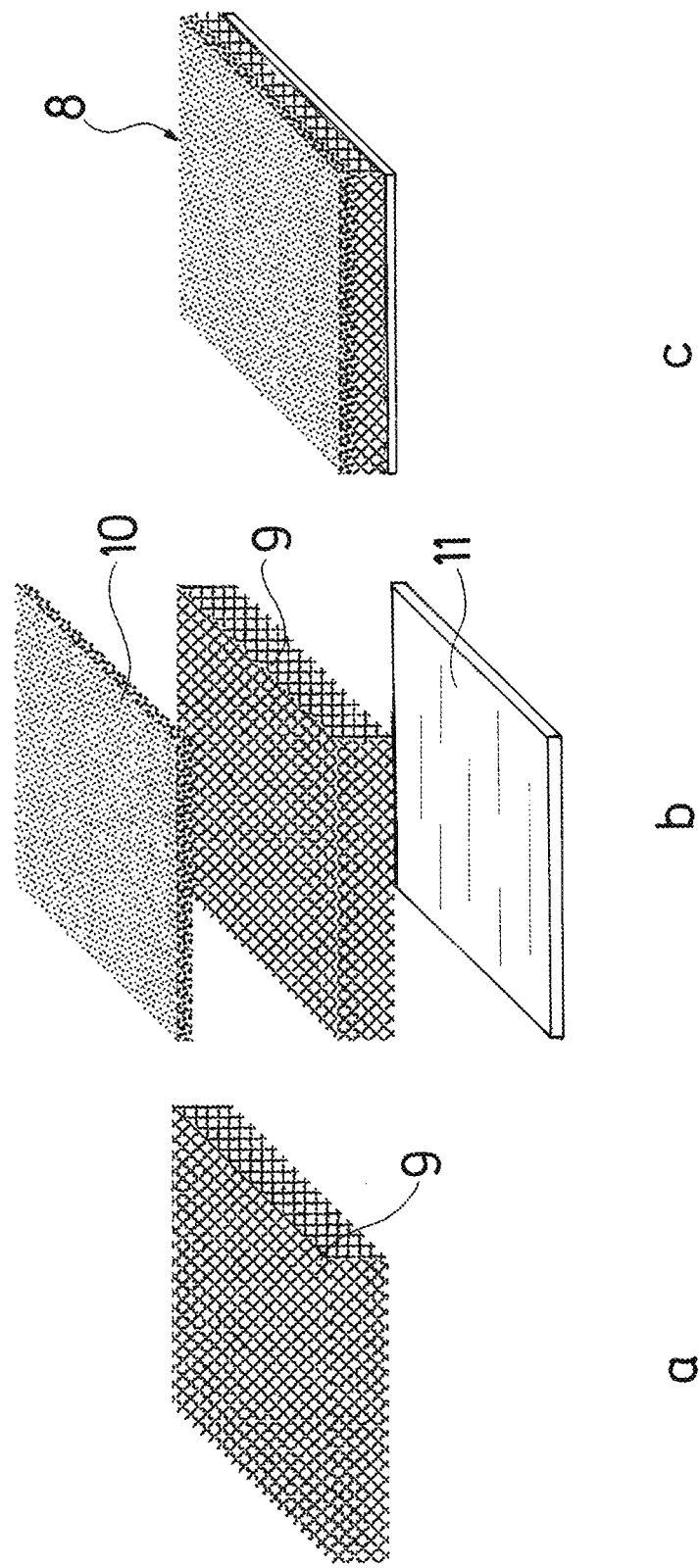

FILTER ELEMENT

CROSS REFERENCE TO RELATED APPLICATIONS

This application is a United States National Phase Application of International Application PCT/EP2013/066541 filed Aug. 7, 2013 and claims the benefit of priority under 35 U.S.C. §119 of European Patent Application EP 12179716.1 filed Aug. 8, 2012, the entire contents of which are incorporated herein by reference.

FIELD OF THE INVENTION

The invention relates to a filter element for a filter element stack with a carrier body, with at least one spacer which can be subjected to throughflow and with at least one filter membrane.

BACKGROUND OF THE INVENTION

In particular for the treatment of service water, it is counted as belonging to the state of the art to let this water flow preferably through rotating stacks of filter elements, in particular filter plates, which is typically arranged in a closed container, with which the medium to be filtered within the container is fed on the outer side of the filter elements, and the filtrate is drawn off as a rule through the filter elements centrally through a shaft or several channels running through the filter element stack. Thereby, it is necessary to clean the filter elements at regular intervals, in order to prevent these from permanently clogging. This can be effected by mechanical wipers/scrapers and/or by way of backflushing.

Independently of how the cleaning of the filter elements is accomplished, these are to be replaced after a certain service life, and thus it is the case of wearing parts. Thus, a basic problem is to be able to manufacture these filter elements as inexpensively as possible. Thereby, the filter elements which are known from EP 1 807 184 B1 and consist completely of plastic are particularly economical, with which a free space for the removal of the filtrate is formed between two filter membranes by way of a fabric. These filter elements although being inexpensive in manufacture, in practice are only useable to a restricted extent, since inherent to its design, a backflushing can only be effected with a comparatively low pressure, and moreover a rotation of the filter element stack constructed of such filter elements is a problem due to the quite low intrinsic stability of the filter elements.

The filter disks known for example from EP 2 002 874 B1 are more favorable as far as this is concerned, with which filter disks the membrane consists of a ceramic material, and two membranes are connected to one another via an intermediately lying carrier body which at the same times holds the ceramic disks at a distance to one another and provides free space for the through-flow. Such filter elements although having a high serviceable life, since they can be backflushed at high pressures, however, are quite extensive in manufacture.

SUMMARY OF THE INVENTION

Against this background, it is an object of the invention to provide a filter element which on the one hand is inexpensive in manufacture and on the other hand has an as long as possible serviceable life.

The filter element according to the invention for a filter element stack comprises a carrier body and at least one spacer able to be subjected to through-flow, as well as at least one filter membrane, wherein the spacer at least partly is formed by a woven fabric or knitted fabric of plastic threads, and the membrane is likewise formed from plastic material.

The basic concept of the present invention is to construct a filter element such that on the one hand the filter element is inexpensively manufacturable, but on the other hand the filter element does not have the previously mentioned disadvantages with regard to the serviceable life. The filter element according to the invention for this comprises a carrier body which gives the complete filter element its shape stability and which in particular supports the at least one spacer subjectable to through-flow and the membrane of plastic material which is arranged thereon, so that these can be backflushed with adequately high pressures and the filter element has a large intrinsic stability which on the one hand permits the use of larger surfaced filter elements and on the other hand permits these to rotate together with the complete stack. Thereby, the applied carrier body is advantageously likewise formed from plastic, wherein the connection between the carrier body and the woven fabric or knitted fabric as well as the woven fabric or knitted fabric and membrane is effected in each case advantageously with a material fit.

In the simplest form, the carrier body can be formed by a disk of any shape, on which the for example single-part filter membrane is arranged amid the inclusion of the spacer as a for example single-piece intermediate layer subjectable to through-flow. Thereby, the woven fabric or knitted fabric is firmly connected to the disk advantageously by way of bonding and the filter membrane to the woven fabric or knitted fabric forming the spacer. Advantageously, the disk is circular or designed with a rounded polygonal shape.

Alternatively, the carrier body can also advantageously be constructed in a skeletal manner and be filled out in its free spaces with woven fabric or knitted fabric of plastic threads. A carrier body in the form of a spoke wheel then results for example, wherein the woven fabric or knitted fabric maintaining the distance of the membrane is arranged in the intermediate spaces between the spokes and to one or as the case may be, also to both sides of the spokes and is covered with a plastic membrane.

Such a skeletally constructed carrier body is advantageously formed by a peripheral ring which comprises webs which are preferably radially inwardly directed spokes. The webs can however alternatively also be arranged parallel to one another at a distance or in a grid-like manner, wherein the free spaces are filled with knitted fabric of plastic threads. Advantageously, the carrier body has a central recess with positive-fit means for the direct and or indirect rotationally fixed arrangement on a shaft, in order to be rotatable together with the shaft passing through the stack. The torque applied by the shaft is transmitted onto the carrier body and by this in a surfaced manner onto the remaining components of the filter elements and thereby the carrier body itself ensures the intrinsic stability of the filter element.

It is particularly advantageous if the carrier body is not directly connected to the shaft but an inner ring is provided, which is provided with positive-fit means for the direct or rotationally fixed arrangement on a shaft and on the other hand engages into the central recess of the carrier body, to which it is connected in a rotationally fixed manner. Such an inner ring according to a further advantageous design of the invention is formed by two preferably identical, closed ring parts which are connected to one another amid the inclusion of parts of the filter element as well as of the carrier body. These ring parts are advantageously designed as plastic injection molded parts and are therefore manufacturable in a particularly inexpensive manner when these are identical in their shape. Thereby, they are usefully designed such that they are clip-fastenable to one another, i.e. engage into one another with a positive fit after overcoming an initial force and are connected to one another by way of this.

Advantageously, such an inner ring comprises at least one radially inwardly directed support surface for support on a central shaft. Advantageously, support surfaces are arranged at the same angular distance over the shaft, so that a uniformly distributed support is effected over the shaft periphery. Thereby, the torque transmission from the shaft onto the filter element does not need to be effected via these support surfaces, but this is advantageously effected in the region of the support rings radially further to the outside, in order to be able to transmit greater forces in this manner, given the same material thickness. Thereby, the inner ring not only serves for transmitting rotation forces but is also advantageously designed in a channel-forming manner. For this, the inner ring comprises at least one transverse recess which forms part of a channel via which the filtrate discharge is effected. Usefully, the transverse recess is thereby designed such that on the one hand a sealed inner lumen for the channel is formed which is open to the inside of the filter element and on the other hand the torque transmission is also effected via this. Thereby, advantageously one or more transverse recesses are arranged in the inner ring and designed such that a channel or channels for the filtrate discharge are formed between filter elements of a filter element stack which bear on one another. These advantageously identical designed inner rings then in the stack form a roughly tubular formation between a central shaft and the surrounding carrier bodies with spacers and filter membranes, and this formation serves for the support of the filter elements on the shaft, for transmitting the torque into the complete filter element stack as well as for filtrate discharge. Thereby, advantageously O-rings or other sealing means are provided in the region of the channels and these O-rings or other sealing means ensure that the inner rings of adjacent filter elements which bear on one another form sealed channels, through which the filtrate can be removed.

The woven fabric or knitted fabric is advantageously formed by plastic threads which are arranged in loops and which are preferably connected to the membrane and/or to the carrier body with a material fit, in order on the one hand to ensure a good through-flow ability and on the other hand an adequate holding function with regard to the distance. Thereby, it is particularly advantageous if the material fit is effected by way of a material, from which the membrane consists and which advantageously connects to the carrier body in a surfaced and sealed manner so that no pressure reduction can be effected between the carrier body and this material when backflushing.

It is particularly favorable with regard to manufacturing technology, if the woven fabric or knitted fabric forming the spacer and with the membrane lying thereabove, and the adhesive layer for connection to the carrier body are manufactured as a roll-up tape which after suitably cutting to size is then only to be bonded onto the carrier body on one side or also on both sides as the case may be. With such an arrangement, the sealing is effected inwards by that of the previously described inner rings. A further sealing however is necessary to the outside and this is preferably effected by way of a peripheral sealing ring. I.e. at least one or as the case may be, also several sealing rings are arranged on the outer periphery of the support body or support bodies, and these sealing rings ensure a radial sealing in this region. Such a seal can advantageously be formed by a polyurethane layer.

The woven fabric or knitted fabric which forms the spacer and channel can be manufactured of various plastic materials. However, it is particularly advantageous to manufacture these of monofilament plastic threads of nylon or polyester, preferably with a thickness of 0.1 to 0.2 mm, since this on the one hand can achieve an inexpensive manufacture and on the other hand a good through-flow ability and finally an adequate spacing function.

Woven fabric in the context of the present invention is to also be understood as knit-fabric, crotchet-fabric or other regular connections of plastic threads, and knitted fabric is to be understood as any irregular connection of plastic threads.

With regard to the channel-forming woven fabric or knitted fabric in the context of the present invention, it is advantageously the case of a 3D-spacer material which is preferably manufactured by way of knitting, e.g. on a Raschel knitting machine. Thereby, it is designed such that within the extension direction of the woven fabric it forms essentially continuous channels and partly interrupted channels in the transverse direction to this, wherein surfaces are formed at the upper side and lower side, and these surfaces are suitable for the surfaced, preferably material-fit connection to further layers which are designed such that the channels/free spaces lying therebelow are adequately supported and an adequately large connection surface is given. In particular paragraph 0045 of EP 1 807 184 B1 is referred to in this context, where the construction of such a woven fabric is described in detail.

The membrane is advantageously manufactured of PES and PVP or PVDF. In this context EP 1 807 184 B1 is also referred to, where suitable materials are specified for forming the knitted fabric and the membrane.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a partly exploded representation of the filtered element stack according to FIG. 1;

FIG. 5 is an exploded representation of the construction of a filter element; and FIG. 6 is a view showing the construction of the membrane and woven fabric as a tape.

DESCRIPTION OF THE PREFERRED EMBODIMENTS

Figure 1:
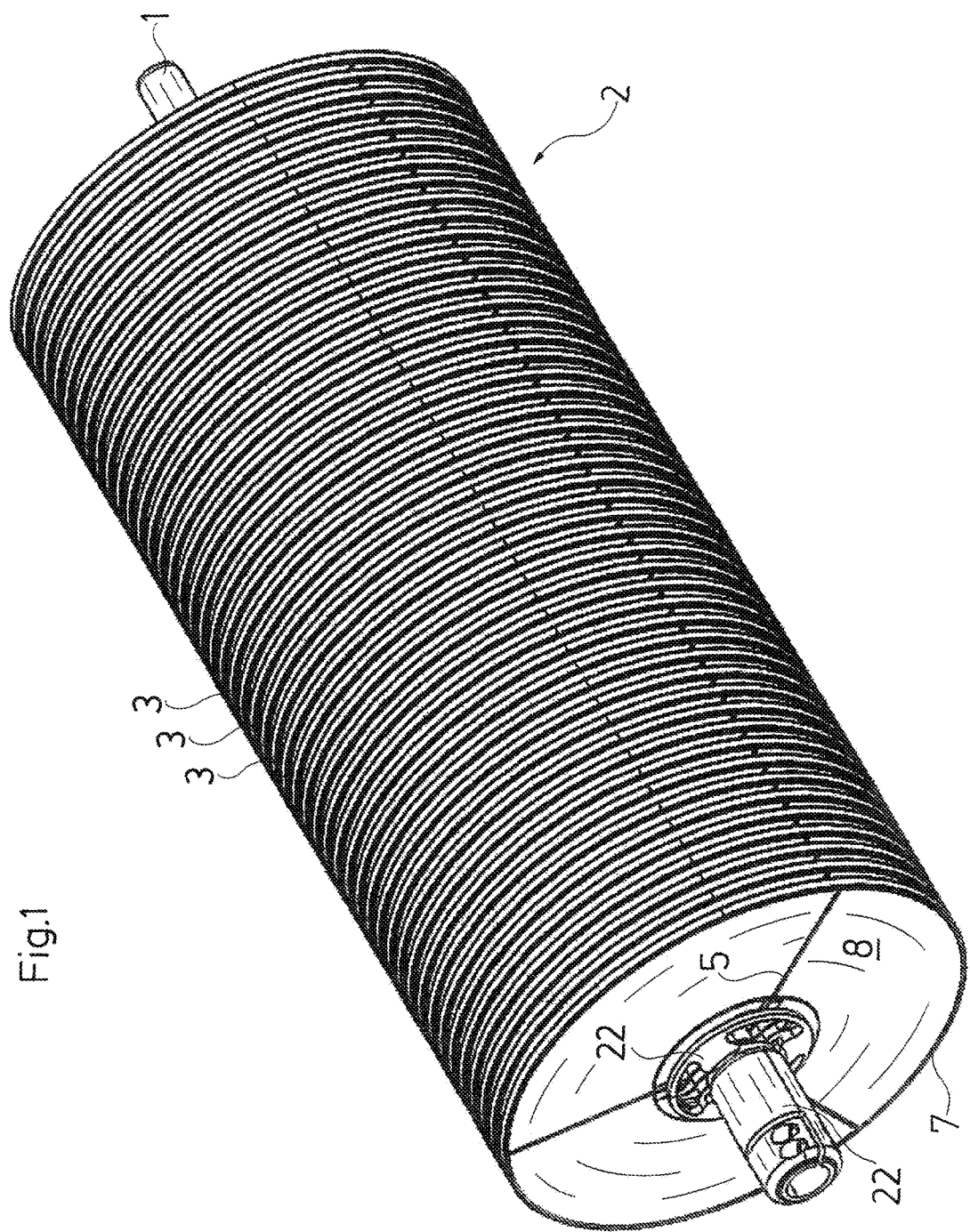
FIG. 1 is a greatly simplified schematic perspective representation of a filter element stack constructed from filter elements.

With regard to the filter element stack 2 constructed of filter elements 3 and represented in FIG. 1, it is the case of one such as is typically applied in a closed cylinder-shaped receptacle, with which water to be filtered is introduced into the receptacle so that its surrounds the plate stack 2. The filter plate stack 2 is thereby arranged on a central shaft 1 which is rotatable via a mostly external drive. The leading-away of the filtrate, with such a stack 2 is typically effected centrally either through a hollow shaft or as with the present design, through channels 19 arranged around the shaft 1. A filter element 3 has an essentially circular disc-like shape and comprises a stable carrier body 4 of plastic which has the shape of an annular disk which on one side is provided with three radial ribs 5 extending radially from a central recess 6 to a peripheral edge 7. The ribs 5 are arranged at both sides of the disk-like part of the carrier body 4 and extend from a central recess 6 up to the peripheral edge 7 which however projects beyond the ribs 5 seen in the axial direction of the stack, thus is designed higher than the ribs 5 with respect to the disk-like part. The peripheral edge 7 in combination with the ribs 5 forms a frame for receiving ring segments of the filter material 8 which is cut to shape in a suitably matching manner and whose construction is represented in FIG. 6c.

This filter material 8 which is manufactured as a tape, consists of a channel-forming woven fabric 9 or knitted fabric of plastic threads which on the side is connected to the filter membrane 10 consisting of plastic, with a material fit, i.e. in a fixed and destruction-free, non-releasable manner, and on the other side likewise has an adhesive layer 11 which is likewise fixedly connected thereto and which serves for the surfaced, gapless and permanent bonding to the disk-like part of the carrier body 4. Thus, corresponding ring segments are punched out of this filter material 8 represented in FIG. 6c, as are represented in FIG. 5, which are then applied into the frame formed by the ribs 5 and the edge 7 and are connected in a fixed and surfaced manner to the disk-like part of the carrier body 4 by way of bonding. Thereby, the woven fabric 9 ensures that the filter membrane 10 remains arranged at a sufficient distance to the disk-like part of the carrier body 4, so that fluid flowing in through the membrane 10 can flow through the channel-forming woven fabric 9 with a low resistance.

A carrier body 4 is thus bonded to six segments of filter material 8, so that filter arrangements result at both sides, with which the membrane 10 can be subjected to through-flow from the outside to the inside. Alternately, for this, one can also envisage providing the carrier body 4 with filter material 8 on only one side.

The filter material 8 with regard to its thickness is adapted to the height of the edge 7 thus terminates with this in a flush or aligned manner. For sealing, a sealing can be provided as the case may be, in the region between the edge 7 and the filter material 8, for example by way of injecting polyurethane into this region, in order to ensure that no fluid can penetrate between the filter membrane 10 and the edge 7. This is particularly important when backflushing, when a pressure impingement and throughflow in the reverse direction, i.e. from the inside to the outside, is effected for cleaning the filter element 3.

The filter material 8 which is bonded onto the carrier body 4 forms an intrinsically stable body with this. In order to integrate this filter material in the desired manner into a filter element stack 2 which transmits the rotation of the shaft 1 onto the filter element 2, comprises suitable means for the discharge of the filtrate and holds the filter elements 3 at the required distance to one another, an inner ring 12 is provided in each case, which is fixed with a positive fit within the recess 6 of the carrier body 4 equipped with filter material 8.

Each inner ring 12 consist of two identical, closed ring parts 13 which in each case comprise a flange-like edge 14 projecting beyond the recess 6. Three rectangular prominences 15 distributed by 120° are arranged on the edge 14 and with regard to the height are dimensioned such that they set the distance of adjacent filter elements 3 on the shaft 1 in the desired manner. These prominences 15 are led out radially inwardly beyond the edge 14 and there are designed as a clip connection, so that when joining together two ring parts 13 amid the inclusion of the carrier body 4 provided with filter material 8 on both sides, the edges 14 of these ring parts 13 bear in tight manner on the filter material 8, and the ring parts are connected in a fixed and destruction-free, releasable manner to one another, into the complete ring disk. Alternatively, the filter elements can also be formed by disk-like carrier bodies which are provided over the whole surface (without ribs) with filter material.

Figure 3:
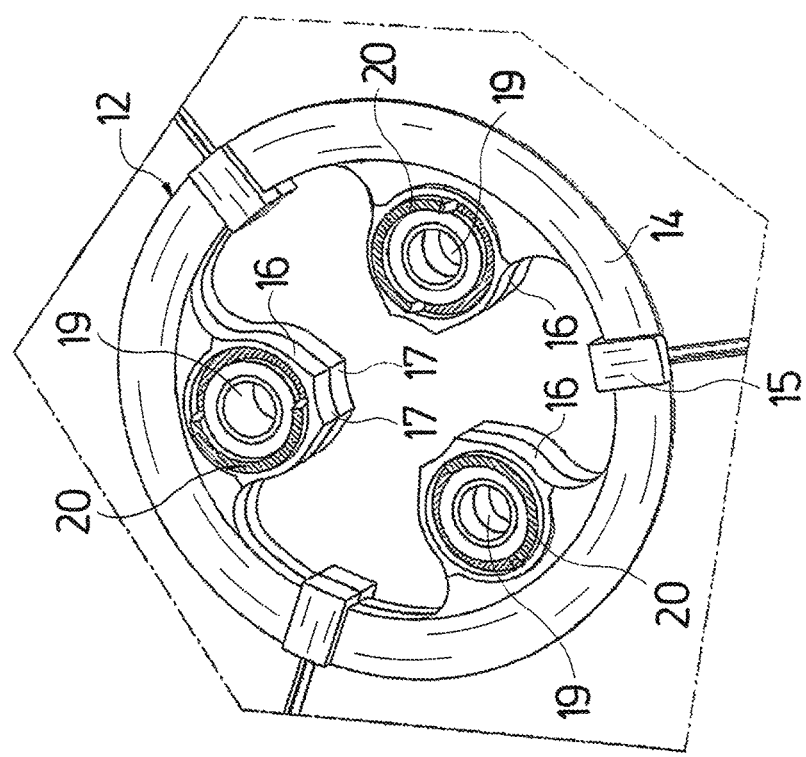
FIG. 3 is an enlarged representation of a detail III of FIG. 2.
Figure 2:
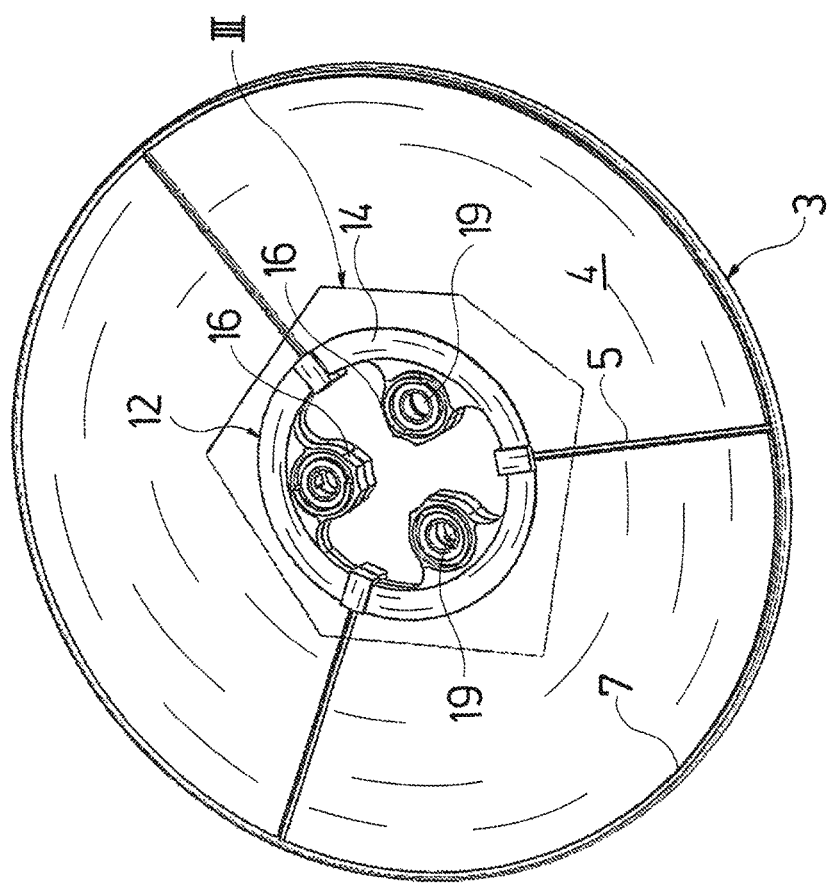
FIG. 2 is a perspective view of a filter element according to the invention.

The inner ring 12 or the two ring parts 13 which are connected to one another comprise three projections 16 which are directed radially inwards from the edge 14 and whose radially inwardly directed surfaces 17 form support surfaces which are supported directly on the shaft 1. These support surfaces 17 are therefore shaped in a part-cylindrical manner according to the curvature of the shaft 1, as is to be clearly deduced in particular from FIG. 3.

Recesses 18 are provided within these projections 16 and are broken through radially to the outside thus in the region below the edge 14, which is to say are designed in an open manner, so that the fluid penetrating through the filter membrane 10 into the filter element 3 can go radially inwards through the woven fabric 9 into the recesses. Otherwise, the recesses 18 are delimited in a tubular manner, so that not only the ring parts 13 of a filter element 3 which are connected to one another form channels 19 running parallel to the shaft 1, but also inner rings 12 of a filter element stack 2 which bear on one another. For this, the recesses 18 on a side of the ring parts 13 and specifically on the side, on which the prominences 15 are formed, are provided with half-ring-shaped prominences 20 at a distance to the recesses 18 and these prominences are arranged and designed such that the half-ring-shaped prominences 20 of adjacent inner rings 12 of filter elements 3 lying next to one another in the stack 2 in each case form a circular prominence, into which an O-ring 21 can be integrated in each case, wherein this O-ring ensures that the channel sections of adjacent inner rings 12 are connected to one another in a sealed manner and form channels 19 which extend over the whole length of the filter element stack and whose ends lead into a common conduit, via which the filtrate is discharged/removed or the fluid is led for the backflushing. These half-ring-like prominences 20 furthermore connect adjacent inner rings 12 of filter elements 3 arranged adjacently next to one another in the stack 2, with a positive fit in a manner such that a transmission of torque within the stack is effected via this. The torque transmission from the central shaft 1 onto the filter element stack is effected by way of a coupling 22 which is visible in the FIGS. 1 and 4. This design has the advantage that an inexpensive shaft 1 which is circular in cross section can be used, and filter elements 3 can be pushed onto the shaft 1 in a simple manner and are merely connected to one another and amongst one another with a positive fit and in a rotationally fixed manner. The rotationally fixed connection to the shaft is effected by the coupling 22 which is not applied until the end of the assembly procedure.

While specific embodiments of the invention have been shown and described in detail to illustrate the application of the principles of the invention, it will be understood that the invention may be embodied otherwise without departing from such principles.

The invention claimed is:

1. A filter element for a filter element stack, the filter element comprising:
   a carrier body;
   at least one spacer which can be subjected to throughflow, the at least one spacer being at least partly formed by a woven fabric or knitted fabric of plastic threads; and
   at least one filter membrane formed of plastic material, wherein the carrier body is formed as a disk, on which the at least one filter membrane and the at least one spacer are arranged, said at least one spacer being an intermediate layer located between said carrier body and said at least one filter membrane, said at least one spacer being connected to said at least one filter membrane via a material fit connection, said material fit connection comprising a material of said at least one filter membrane, said at least one filter membrane being located at a spaced location from said carrier body.

2. A filter element according to claim 1, wherein the carrier body comprises a central recess with means for the direct or indirect, rotationally fixed arrangement of said carrier body on a shaft, wherein said carrier body moves based on movement of said shaft.

3. A filter element according to claim 2, wherein the carrier body comprises free spaces, said free spaces being filled out with said woven fabric or knitted fabric of plastic threads.

4. A filter element according to claim 3, wherein the carrier body comprises a peripheral ring with webs comprising radially inwardly directed spokes.

5. A filter element according to claim 2, wherein an inner ring is provided which is provided with positive-fit means for the direct or indirect rotationally fixed arrangement of said inner ring on said shaft.

6. A filter element according to claim 5, wherein the inner ring is formed by two ring parts which are connected to one another.

7. A filter element according to claim 6, wherein at least a portion of said at least one filter membrane, at least a portion of said at least one spacer and at least a portion of said carrier body are arranged between one of said ring parts and another one of said ring parts.

8. A filter element according to claim 5, wherein the inner ring comprises at least one radially inwardly directed support surface, said at least one inwardly directed support surface engaging said shaft, said carrier body being connected to said shaft via said inner ring.

9. A filter element according to claim 2, wherein the inner ring comprises at least one channel which connects an interior formed between the membrane and the carrier body, to at least one transverse recess for a filtrate discharge.

10. A filter element according to claim 9, wherein the at least one transverse recess is arranged in the inner ring such that said at least one transverse recess forms a channel or channels for the filtrate discharge between filter elements of a filter element stack which are in contact with one another.

11. A filter element according to claim 2, wherein the woven fabric or knitted fabric comprises plastic threads, said plastic threads being arranged in loops and connected to at least one of the membrane and the carrier body with a material fit.

12. A filter element according to claim 2, wherein the carrier body at an outer periphery thereof is sealed by way of a sealing ring.

13. A filter element according to claim 2, wherein the woven fabric or knitted fabric of plastic threads comprise plastic threads consisting of nylon or polyester, in a thickness of 0.1 to 0.2 mm.

14. A filter element according to claim 2, wherein the membrane consists of PES and PVP or PVDF.

15. A filter element for a filter element stack, the filter element comprising:
   a disk-shaped carrier body;
   a spacer which can be subjected to throughflow, said spacer being at least partly formed by a woven fabric or knitted fabric of plastic threads; and
   a filter membrane formed of plastic material, said filter membrane and said spacer being connected to said carrier body, said spacer being located between said carrier body and said filter membrane, wherein said at least one filter membrane is maintained at a spaced location from said carrier body via said at least one spacer.

16. A filter element according to claim 15, wherein the carrier body comprises a central recess with means for the direct or indirect, rotationally fixed arrangement of said carrier body on a shaft, said filter membrane engaging said spacer, wherein said carrier body moves based on movement of said shaft, said carrier body not rotating relative to said shaft.

17. A filter element according to claim 16, wherein an inner ring is provided which is provided with a positive-fit means for a direct or indirect rotationally fixed arrangement of said inner ring on said carrier body and said shaft.

18. A filter element according to claim 17, wherein the inner ring comprises at least one radially inwardly directed support surface, said at least one inwardly directed support surface engaging said shaft, said carrier body being connected to said shaft via said inner ring.

19. A filter assembly, comprising:
   a shaft;
   a disk-shaped carrier body, said carrier body being fixed to said shaft such that said carrier body rotates based on movement of said shaft;
   a spacer which can be subjected to throughflow, said spacer being at least partly formed by a woven fabric or knitted fabric of plastic threads; and
   a filter membrane formed of at least a plastic material layer, said filter membrane and said spacer being connected to said carrier body, said spacer being located between said carrier body and said filter membrane, said plastic material layer being arranged at a spaced location from said carrier body.

20. A filter assembly according to claim 19, further comprising:
   an inner ring in direct contact with said shaft, said carrier body being fixed to said shaft via said inner ring, wherein said carrier body does not rotate relative to said shaft.

* * * * *